United States Patent
Heiling et al.

(10) Patent No.: US 10,156,883 B2
(45) Date of Patent: *Dec. 18, 2018

(54) WAKEUP RECEIVER CIRCUIT, ELECTRONIC SYSTEM AND METHOD TO WAKEUP A DEVICE

(71) Applicant: Infineon Technologies AG, Neubiberg (DE)

(72) Inventors: Christian Heiling, Graz (AT); Heimo Hartlieb, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 124 days.

This patent is subject to a terminal disclaimer.

(21) Appl. No.: 15/276,445

(22) Filed: Sep. 26, 2016

(65) Prior Publication Data
US 2017/0010649 A1    Jan. 12, 2017

Related U.S. Application Data

(63) Continuation of application No. 13/952,443, filed on Jul. 26, 2013, now Pat. No. 9,483,099.

(51) Int. Cl.
*G06F 1/32* (2006.01)

(52) U.S. Cl.
CPC .......... *G06F 1/3206* (2013.01); *G06F 1/3209* (2013.01); *G06F 1/3293* (2013.01); *G06F 1/3243* (2013.01)

(58) Field of Classification Search
CPC .................................................. G06F 1/3206
See application file for complete search history.

(56) References Cited

U.S. PATENT DOCUMENTS

| | | | |
|---|---|---|---|
| 6,115,831 A * | 9/2000 | Hanf | B60R 16/0315 714/43 |
| 6,555,991 B1 | 4/2003 | Zettel et al. | |
| 6,747,498 B1 | 6/2004 | Pauletti et al. | |
| 6,812,589 B1 * | 11/2004 | Fey | H04L 12/40032 307/10.3 |
| 9,483,099 B2 * | 11/2016 | Heiling | G06F 1/3206 |
| 2004/0119517 A1 * | 6/2004 | Pauletti | H04L 12/40032 327/198 |
| 2005/0225389 A1 | 10/2005 | Koyasu | |
| 2008/0276107 A1 * | 11/2008 | Bogavac | H04L 12/12 713/323 |
| 2010/0001737 A1 | 1/2010 | Kubo et al. | |
| 2010/0064160 A1 * | 3/2010 | Wilson | G06F 1/3203 713/324 |
| 2012/0257655 A1 * | 10/2012 | Muth | H04L 12/12 375/219 |
| 2012/0327942 A1 | 12/2012 | Terabe et al. | |
| 2013/0007489 A1 | 1/2013 | Unnikrishnan et al. | |

(Continued)

FOREIGN PATENT DOCUMENTS

| CN | 1628404 A | 6/2005 |
|---|---|---|
| CN | 1818895 A | 8/2006 |

*Primary Examiner* — Vincent H Tran
(74) *Attorney, Agent, or Firm* — Slater Matsil, LLP

(57) ABSTRACT

A system includes multiple devices connected in a chain-like structure, each device of the multiple devices coupled to at least one bus. A device of the plurality of devices includes a circuit configured to detect activity of a differential signal of a bus coupled to the device to cause a wakeup of the device in response to the detection.

16 Claims, 2 Drawing Sheets

(56) References Cited

U.S. PATENT DOCUMENTS

| | | | |
|---|---|---|---|
| 2013/0128899 A1* | 5/2013 | Hartwich | H04L 12/40039 370/458 |
| 2013/0285445 A1* | 10/2013 | Melzl | G06F 1/28 307/10.1 |
| 2014/0365693 A1 | 12/2014 | Monroe et al. | |
| 2015/0033052 A1 | 1/2015 | Heiling et al. | |

* cited by examiner

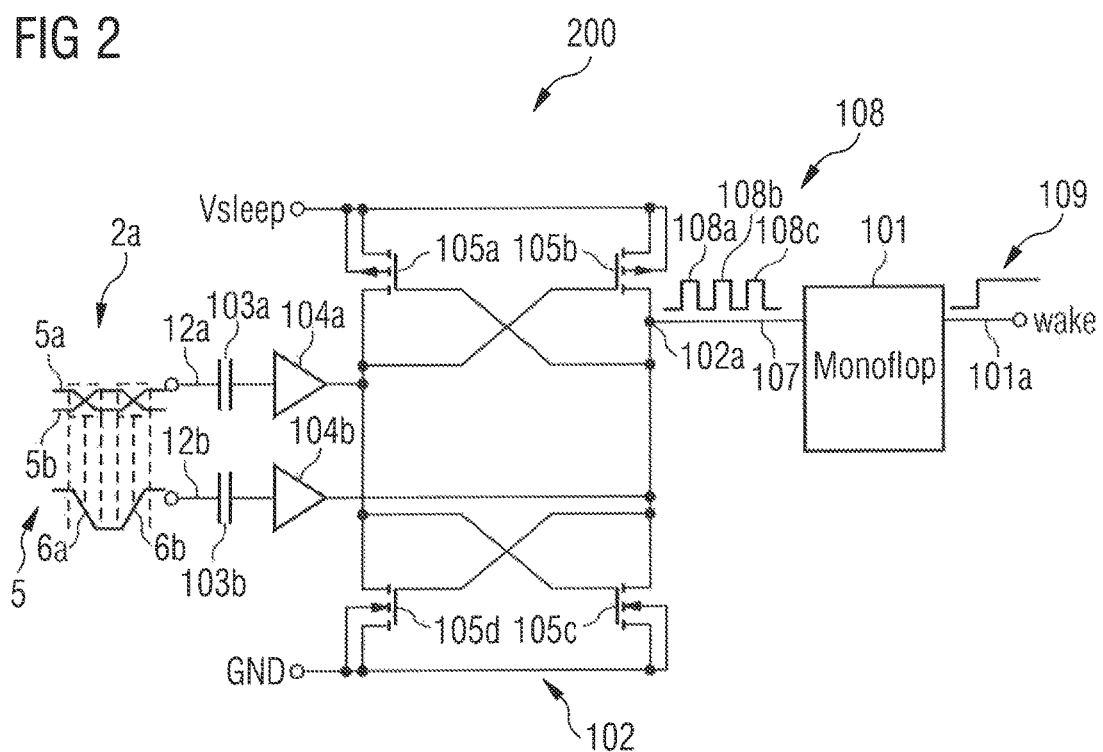

WAKEUP RECEIVER CIRCUIT, ELECTRONIC SYSTEM AND METHOD TO WAKEUP A DEVICE

CROSS-REFERENCE TO RELATED APPLICATIONS

This application is a continuation of U.S. patent application Ser. No. 13/952,443, filed on Jul. 26, 2013, entitled "Wakeup Receiver Circuit, Electronic System and Method to Wake up a Device," which application is hereby incorporated herein by reference in its entirety.

TECHNICAL FIELD

The invention relates to a wakeup receiver circuit, and to a method to wakeup a device. Further, the invention generally relates to an electrical or electronic system, and more specifically, to a system comprising a bus.

BACKGROUND

In electrical or electronic systems, various individual system modules, for instance various electronic/electric assemblies, various electronic/electric components, for instance various semiconductor components such as integrated circuits, etc., various subcomponents, provided in one and the same component or integrated circuit etc., communicate via a transfer medium such as a bus system.

A bus system may comprise one or more transfer lines. Bus systems can be used jointly by several, in particular by two or more than two devices of a respective system.

Many conventional bus systems comprise several partial systems, for example, a data bus, consisting of one or more data lines, and/or an address bus, consisting of one or more address lines, and/or a control bus, consisting of one or more control lines, etc.

In comparison to this, other bus systems are of a much simpler construction. For example, a so-called IBCB bus (IBCB=Inter Block Communication Bus) in general merely comprises two transmission lines to connect two respective devices.

Further examples for relatively simple bus systems are CAN busses (CAN=Controller Area Network), which generally only comprise two or three lines (e.g., CAN_HIGH, CAN_LOW, and—optionally—CAN_GND (ground)), LIN busses (LIN=Local Interconnect Network), which generally comprise only one single transmission line, etc.

In many conventional systems, for instance, in systems with an IBCB bus, various devices may be connected in a chain-like structure. For instance, a first component may be connected via two IBCB transmission lines to a second component, the second component may be connected via two IBCB transmission lines to a third component, the third component may be connected via two IBCB transmission lines to a fourth component, etc. Hence, e.g., a logical "1" (or correspondingly, a logical "0") may first be transmitted from the first component to the second component in the above chain of components, then from the second component to the third component, then from the third component to the fourth component, etc.

In addition, a central microprocessor or microcontroller may be provided, which e.g., may be connected with the first (or last) component in the above chain of components, e.g., via SPI (SPI=Serial Peripheral Interface), or any other suitable connection.

The above system, i.e., the above devices connected via the above IBCB bus, and/or the above central microprocessor or microcontroller may, e.g., be used to control a battery, and/or the cells of a battery, for instance, the battery of a respective vehicle such as a car.

To avoid that the above devices themselves consume too much energy from the battery, especially during periods of time when they are not needed, they might be brought into a power saving mode/power down mode.

To bring the devices back from the power saving mode/power down mode to a normal operating mode ("wakeup"), the above devices may be provided with so-called wakeup receivers.

Wakeup receivers may, e.g., be adapted to detect by use of respective comparators detecting absolute signal levels on the IBCB bus that a specific dedicated wakeup signal sequence was sent, and may, in return, trigger that a respective device is brought back from the power saving mode/power down mode to a normal operating mode ("wakeup").

However, the wakeup receivers themselves may consume a considerable amount of energy from the battery, even when the system is in the above power saving mode/power down mode.

For these or other reasons there is a need for an improved system, an improved wakeup receiver circuit, and an improved method to wakeup a device.

SUMMARY

In accordance with an embodiment of the present invention, a method includes operating a device in a low power mode of operation, the device coupled to a bus. The method also includes receiving, by the device, a differential signal from the bus. The differential signal includes a first polarity signal and a second polarity signal. The method also includes detecting, by the device, activity on the bus, and causing a wakeup of the device in response to the detection of the activity.

In accordance with an embodiment of the present invention, a circuit includes a wakeup receiver circuit coupled to a bus and configured to detect a change of a differential signal present on the bus to cause a wakeup of a device coupled to the bus in response to the detection. The wakeup receiver circuit includes a cross-coupled transistor latch circuit configured to be coupled to the bus and a monoflop circuit coupled to an output of the cross-coupled transistor latch circuit.

In accordance with an embodiment of the present invention, a system includes multiple devices connected in a chain-like structure, each device of the multiple devices coupled to at least one bus. A device of the multiple devices includes a circuit configured to detect activity of a differential signal of a bus coupled to the device to cause a wakeup of the device in response to the detection.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

FIG. 2 schematically depicts an example of a wakeup receiver circuit according to an embodiment of the invention.

DETAILED DESCRIPTION OF ILLUSTRATIVE EMBODIMENTS

Figure 1:
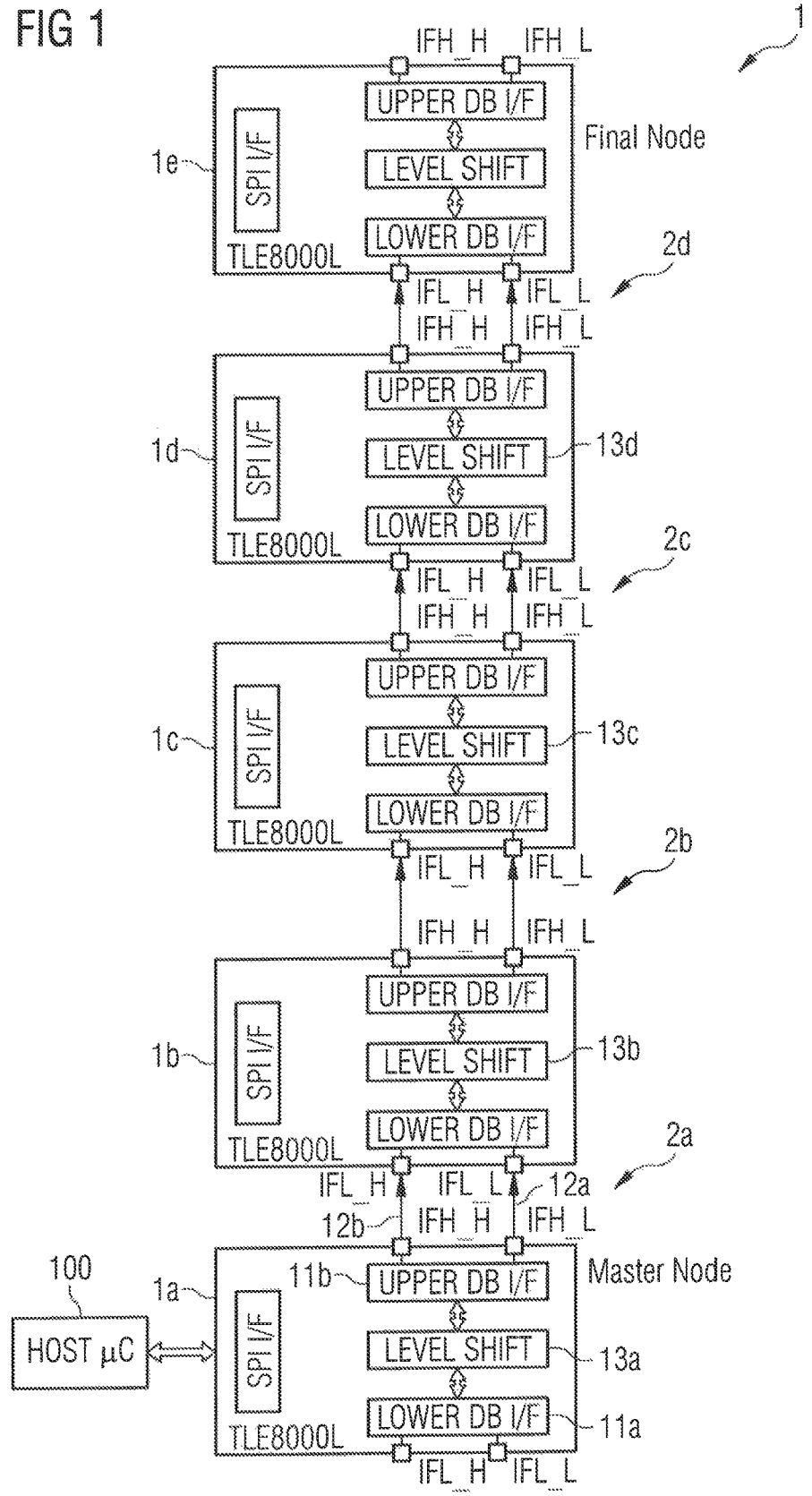
FIG. 1 depicts a schematic structure of an exemplifying electronic/electric system comprising a bus in which a wakeup receiver circuit according to an embodiment of the invention may be employed.

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

FIG. 1 shows a schematic representation of an exemplifying electronic/electric system 1 comprising a bus in which a wakeup receiver circuit according to an embodiment of the invention may be employed.

As shown in FIG. 1, the system 1 comprises a plurality of devices 1a, 1b, 1c, 1d, 1e which are connected in a chain-like structure over various busses 2a, 2b, 2c, 2d. The devices can be any electronic device that could be connected to a bus such as modules, components, elements and integrated circuits.

The devices 1a, 1b, 1c, 1d, 1e may, e.g., be or comprise semiconductor components such as integrated circuits 1a, 1b, 1c, 1d, 1e, for instance, respective ASICS (ASIC=application specific integrated circuit), Microprocessors, Microcontrollers, etc., or any other kind of integrated circuit or component comprising an integrated circuit. In particular embodiments, the components may be or comprise respective BALI ASICS (BALI=Battery Management for Lithium Ion Cells) 1a, 1b, 1c, 1d, 1e, etc.

Alternatively, the system 1 may be, e.g., a single integrated circuit chip, comprising various subcomponents 1a, 1b, 1c, 1d, 1e, provided in one and the same single integrated circuit chip 1, the various sub-components or elements 1a, 1b, 1c, 1d, 1e of the single integrated circuit chip 1 being connected in a chain-like structure over various chip-internal busses 2a, 2b, 2c, 2d.

Preferably, the system 1 comprises a relatively high number of devices 1a, 1b, 1c, 1d, 1e, e.g., more than two, in particular, more than five or ten or twenty devices 1a, 1b, 1c, 1d, 1e, e.g., more than five or ten or twenty separate integrated circuits (or subcomponents of a single integrated circuit), connected in the above chain-like structure over the above busses 2a, 2b, 2c, 2d.

Each of the busses 2a, 2b, 2c, 2d, e.g., may comprise, as shown in FIG. 1, two respective transmission lines 12a, 12b, over which data may, e.g., be transmitted in differential form. Alternatively, each bus may, e.g., only comprise one single transmission line, or more than two, e.g., three or more than three transmission lines.

For example, the busses 2a, 2b, 2c, 2d may be respective IBCB busses (IBCB=Inter Block Communication Bus), or any other kind of busses (e.g., respective CAN busses (CAN=Controller Area Network), LIN busses (LIN=Local Interconnect Network), or similar busses, etc.).

The above system 1, e.g., may be used in a vehicle, e.g., a car, a plane, a helicopter, a motorcycle, etc., in particular, in a car comprising an electric engine (and/or a combustion engine).

For instance, the system 1 may be used to control a battery, e.g., a battery provided in an electric vehicle, or any other battery provided, e.g., in any of the above-mentioned vehicles.

In the battery, several cells, e.g., respective Lithium Ion Cells, or any other kind of cells may be connected in series. The series connection of the cells may result in the battery providing a total voltage of more than ten, preferably more than hundred, two hundred or five hundred volts.

Each of the above devices 1a, 1b, 1c, 1d, 1e of the system 1, e.g., each of the above integrated circuits/ASICS 1a, 1b, 1c, 1d, 1e may be used to monitor and/or control different ones of the above cells, and/or different blocks of cells/battery modules, each block of cells/battery module comprising several, different ones of the cells.

For instance, a first integrated circuit/ASIC is of the above integrated circuits 1a, 1b, 1c, 1d, 1e may be used to monitor and/or control a first cell, and/or a first battery module, a second integrated circuit/ASIC 1b of the above integrated circuits 1a, 1b, 1c, 1d, 1e may be used to monitor and/or control a second cell, and/or a second battery module, a third integrated circuit/ASIC is of the above integrated circuits 1a, 1b, 1c, 1d, 1e may be used to monitor and/or control a third cell, and/or a third battery module, a fourth integrated circuit/ASIC 1d of the above integrated circuits 1a, 1b, 1c, 1d, 1e may be used to monitor and/or control a fourth cell, and/or a fourth battery module, etc.

Thereby, e.g., the electric charge loaded in the respective cells/block of cells associated with a respective integrated circuit 1a, 1b, 1c, 1d, 1e may be detected by a respective integrated circuit 1a, 1b, 1c, 1d, 1e. Alternatively or in addition thereto, with the help of a respective integrated circuit 1a, 1b, 1c, 1d, 1e, an appropriate reaction to a detected electric charge loaded in respective cells/blocks of cells may be controlled. For instance, by use of a respective integrated circuit 1a, 1b, 1c, 1d, 1e, a single associated cell, and/or an associated block of cells may be discharged (passive balancing). Further, by use of a respective integrated circuit 1a, 1b, 1c, 1d, 1e, charge may be transferred between single cells, and/or respective blocks of cells (active balancing).

The above busses 2a, 2b, 2c, 2d, e.g., may be used to transmit data referring to the detected electric charge loaded in respective cells/block of cells associated with a respective one of the integrated circuits 1a, 1b, 1c, 1d, 1e, or any other kind of data, from the respective integrated circuit 1a, 1b, 1c, 1d, 1e to a central microprocessor or microcontroller 100, e.g., a respective Battery Management Supervisor Controller, and/or to other ones of the above integrated circuits 1a, 1b, 1c, 1d, 1e, and/or vice versa (e.g., from the central microprocessor or microcontroller/Battery Management Supervisor Controller 100 to the above integrated circuits 1a, 1b, 1c, 1d, 1e). The above central microprocessor or microcontroller 100/Battery Management Supervisor Controller, e.g., may be connected with the first integrated circuit is in the above chain of integrated circuits 1a, 1b, 1c, 1d, 1e, e.g., a respective "Master Node" circuit 1a. The connection between the central microprocessor or microcontroller 100 and the "Master Node" circuit 1a, e.g., may be achieved via SPI (SPI=Serial Peripheral Interface), or any other suitable connection.

The above central microprocessor or microcontroller 100/Battery Management Supervisor Controller, in turn, may be connected to the main control device of the vehicle, e.g., via a respective CAN bus (CAN=Controller Area Network), or any other suitable connection.

Each of the above devices 1a, 1b, 1c, 1d, 1e of the system 1, e.g., each of the above integrated circuits/ASICS 1a, 1b, 1c, 1d, 1e may comprise a first interface, e.g., a Lowside Interface (LS Interface) 11a, a second interface, e.g., a Highside Interface (HS Interface) 11b, and, optionally, a Level shifter 13a, 13b, 13c, 13d connected between the LS Interface 11a, and the HS Interface 11b. Each Level shifter 13a, 13b, 13c, 13d may be connected with the respective additional logic circuits of a respective integrated circuit/ASIC 1a, 1b, 1c, 1d, 1e.

Hence, a respective data signal may, e.g., be transmitted from the integrated circuit/ASIC 1a, i.e., the "Master Node" circuit is (in particular, the respective Highside Interface (HS Interface) 11b thereof) via the bus 2a to the integrated circuit/ASIC 1b (in particular, the respective Lowside Interface (LS Interface) thereof). By the Level Shifter 13b of the integrated circuit/ASIC 1b the received data signal is shifted from the voltage domain of the ASIC 1a to the voltage domain of the ASIC 1b. Then, the voltage shifted received data signal may, e.g., be transmitted from the integrated circuit/ASIC 1b (in particular, the respective Highside Interface (HS Interface) thereof) via the bus 2b to the integrated circuit/ASIC 1c (in particular, the respective Lowside Interface (LS Interface) thereof).

Thereafter, by the Level Shifter 13c of the integrated circuit/ASIC 1c the received data signal is shifted from the voltage domain of the ASIC 1b to the voltage domain of the ASIC 1c. Then, the voltage shifted received data signal may, e.g., be transmitted from the integrated circuit/ASIC 1c (in particular, the respective Highside Interface (HS Interface) thereof) via the bus 2c to the integrated circuit/ASIC 1d (in particular, the respective Lowside Interface (LS Interface) thereof). By the Level Shifter 13d of the integrated circuit/ASIC 1d the received data signal is shifted from the voltage domain of the ASIC 1c to the voltage domain of the ASIC 1d, and is then transmitted from the integrated circuit/ASIC 1d (in particular, the respective Highside Interface (HS Interface) thereof) via the bus 2d to the next ASIC in the chain, etc., until the data signal is received by the last ASIC 1e in the chain ("Final Node" circuit 1e).

Each integrated circuit/ASIC 1a, 1b, 1c, 1d, 1e, in particular, each of the above Level shifters may, e.g., shift the level of the data signals by a relatively high voltage amount, e.g., between 1V and 200V, in particular, between 5V and 100V, or 10V and 80V, e.g., up to 60V.

The busses 2a, 2b, 2c, 2d hence may be seen as commonly forming a bus system, where the separate buses 2a, 2b, 2c, 2d are galvanically decoupled from one another.

In addition, in some embodiments, the galvanic connection between respective HS and LS Interfaces of two different ones of the above integrated circuits/ASICs provided by a respective one of the above busses 2a, 2b, 2c, 2d (e.g., the galvanic connection between the HS Interface 11b of the integrated circuit/ASIC 1a and the LS Interface of the integrated circuit/ASIC 1b provided by the bus 2a, etc.) may be interrupted by a respective series connection of capacitors.

The above devices 1a, 1b, 1c, 1d, 1e of the system 1 may, e.g., be powered by the above battery/battery cells. For instance, each of the devices 1a, 1b, 1c, 1d, 1e of the system 1 may be powered by the respective associated cells/blocks of cells/battery modules, i.e., the cells/blocks of cells/battery modules a respective device 1a, 1b, 1c, 1d, 1e is adapted to monitor and/or control.

To avoid that the above devices 1a, 1b, 1c, 1d, 1e themselves consume too much energy from the battery, especially during periods of time when they are not needed, they might be brought from a normal operating mode into a power saving mode/power down mode.

This may, e.g., be triggered by the central microprocessor or microcontroller 100/Battery Management Supervisor Controller or, e.g., by the above first device 1a in the above chain (e.g., the "Master Node" circuit 1a) (or, e.g., by any other of the above devices 1b, 1c, 1d, 1e), or, e.g., by the above main control device of the vehicle, or any other suitable device.

For example, to bring the devices 1a, 1b, 1c, 1d, 1e from a normal operating mode into a power saving mode/power down mode, a respective power down control signal may be sent out from the first device 1a in the above chain (i.e., the "Master Node" circuit 1a) to the other devices 1b, 1c, 1d, 1e in the chain. The power down control signal, e.g., may be a data signal comprising a specific, predetermined sequence of bits, for instance, a specific, predetermined combination of logical "1"s and logical "0"s transmitted consecutively from the above "Master Node" circuit 1a over the above busses 2a, 2b, 2c, 2d from one circuit to the other to the above last circuit 1e in the above chain, i.e., the above "Final Node" circuit 1e.

Hence, the power down control signal may, e.g., first be transmitted from the integrated circuit/ASIC 1a, i.e., the "Master Node" circuit 1a (in particular, the respective Highside Interface (HS Interface) 11b thereof) via the bus 2a to the integrated circuit/ASIC 1b (in particular, the respective Lowside Interface (LS Interface) thereof). By the Level Shifter 13b of the integrated circuit/ASIC 1b the received power down control signal is shifted from the voltage domain of the ASIC 1a to the voltage domain of the ASIC 1b. Then, the voltage shifted received power down control signal may, e.g., be transmitted from the integrated circuit/ASIC 1b (in particular, the respective Highside Interface (HS Interface) thereof) via the bus 2b to the integrated circuit/ASIC 1c (in particular, the respective Lowside Interface (LS Interface) thereof).

Thereafter, by the Level Shifter 13c of the integrated circuit/ASIC 1c the received power down control signal is shifted from the voltage domain of the ASIC 1b to the voltage domain of the ASIC 1c. Then, the voltage shifted received power down control signal may, e.g., be transmitted from the integrated circuit/ASIC 1c (in particular, the respective Highside Interface (HS Interface) thereof) via the bus 2c to the integrated circuit/ASIC 1d (in particular, the respective Lowside Interface (LS Interface) thereof). By the Level Shifter 13d of the integrated circuit/ASIC 1d the received power down control signal is shifted from the voltage domain of the ASIC 1c to the voltage domain of the ASIC 1d, and is then transmitted from the integrated circuit/ASIC 1d (in particular, the respective Highside Interface (HS Interface) thereof) via the bus 2d to the next ASIC in the chain, etc., until the power down control signal is received by the last ASIC 1e in the chain ("Final Node" circuit 1e).

In response to receiving the power down control signal, the devices 1a, 1b, 1c, 1d, 1e are brought from the normal operating mode into the power saving mode/power down mode.

In the power saving mode/power down mode, the above devices 1a, 1b, 1c, 1d, 1e consume much less energy from the battery, than in the normal operating mode. In particular, as will be described below, in the power down mode, the above devices 1a, 1b, 1c, 1d, 1e may consume no, or almost no, energy.

For this purpose, in the power down mode, one or several voltage supplying means, provided on a respective device 1a, 1b, 1c, 1d, 1e, which in the normal operating mode, derived from a voltage supplied by the battery, supply one or several relatively high, regulated voltages Vsupply for the device 1a, 1b, 1c, 1d, 1e, may be deactivated. Hence, in the power down mode, other than in the normal operating mode, these one or several relatively high, regulated voltages Vsupply are not available on the device 1a, 1b, 1c, 1d, 1e. Hence, one or several parts of a respective device 1a, 1b, 1c, 1d, 1e fed by these relatively high, regulated voltages Vsupply, e.g., a respective Level Shifter, etc., are then completely shut down.

However, even in the power saving mode/power down mode, as will be described below, a relatively low voltage Vsleep may still be available on a respective device 1a, 1b, 1c, 1d, 1e. The relatively low voltage Vsleep, e.g., may be an unregulated voltage and, e.g., may also be derived from the voltage supplied by the battery, or from any other suitable voltage. As the relatively low voltage Vsleep, may be an unregulated voltage, it may, other than the above one or several relatively high voltages Vsupply, be provided without the use of a respective voltage regulator.

After the above power saving mode/power down mode, the above devices 1a, 1b, 1c, 1d, 1e may be brought back to the normal operating mode.

This may, e.g., be triggered by the central microprocessor or microcontroller 100/Battery Management Supervisor Controller or, e.g., by the above first device is in the above chain (e.g., the "Master Node" circuit 1a) (or, e.g., by any other of the above devices 1b, 1c, 1d, 1e), or, e.g., by the above main control device of the vehicle, or any other suitable device.

For example, to bring the devices 1a, 1b, 1c, 1d, 1e back from the power saving mode/power down mode to the normal operating mode, a respective wakeup sequence may be sent out from the first device is in the above chain (i.e., the "Master Node" circuit 1a) to the other devices 1b, 1c, 1d, 1e in the chain.

The wakeup sequence, e.g., may, at least in theory, comprise any arbitrarily chosen sequence of bits. In other words, other than other control signals, the wakeup sequence need not necessarily comprise a specific, predetermined sequence of bits. In contrast, as will become clear from what is described below, any kind of deliberate activity on the bus 2a, 2b, 2c, 2d may be detected as the presence of a wakeup sequence, whilst no activity (or no deliberate activity) on the bus 2a, 2b, 2c, 2d may be detected as non-presence of a wakeup sequence.

For instance, as one example of a wakeup sequence, a series of logical "1"s and logical "0"s may be transmitted consecutively, in alternating fashion, from the above "Master Node" circuit 1a over the above busses 2a, 2b, 2c, 2d to the other circuits, where the alternation occurs as fast/as often as maximally allowed by the specification of the bus. In other words, the wakeup sequence may, e.g., be of the form "101010101010 . . . " or "010101010101 . . . " Hence, a wakeup sequence showing a maximum amount of activity on the bus 2a, 2b, 2c, 2d may be chosen as a wakeup sequence, to facilitate the distinction between "activity on the bus" (which, as said, may be detected as the presence of a wakeup sequence), and "no activity/no deliberate activity on the bus" (which, as said, may be detected as non-presence of a wakeup sequence).

For instance, as is shown in FIG. 2, as a wakeup sequence, a toggling differential signal 5 may be used, comprising a positive polarity signal 5a transmitted, e.g., via the above transmission line 12a, and a negative polarity signal 5b transmitted, e.g., via the above transmission line 12b.

As is further shown in FIG. 2, to detect the presence of a wakeup sequence on the bus 2a, 2b, 2c, 2d, each device 1a, 1b, 1c, 1d, 1e of the above system 1 may be provided or associated with a respective wakeup receiver circuit 200. The wakeup receiver circuit 200 may, e.g., be an integral part of the respective device 1a, 1b, 1c, 1d, 1e (or, alternatively, may be provided separate therefrom).

For instance, as is shown in FIG. 2 and FIG. 1, the wakeup receiver circuit 200 of the device 1b may be connected to the bus 2a/the above transmission lines 12a, 12b of the bus 2a. Similarly, the wakeup receiver circuit of the device 1c may be connected to the bus 2b, the wakeup receiver circuit of the device 1d may be connected to the bus 2c, etc.

As is shown in FIG. 2, each wakeup receiver circuit 200 may comprise a (retriggerable) monoflop 101/a (retriggerable) univibrator 101 coupled to a latch 102, which may be capacitively coupled to the above bus 2a/the above transmission lines 12a, 12b.

For the above capacitive coupling of the latch 102 to the bus 2a/the above transmission lines 12a, 12b, respective capacitive elements may be used, e.g., respective capacitors 103a, 103b.

Further, between the capacitors 103a, 103b and the latch 102, respective amplifying elements 104a, 104b may be coupled, e.g., so-called bus boosters.

As is further shown in FIG. 2, the latch 102 may, e.g., be coupled to the above voltage Vsleep, and to a ground voltage (GND).

Further, the latch 102 may comprise two pairs of transistors 105a, 105b, 105c, 105d, e.g., two pairs of cross-coupled field effect transistors 105a, 105b, 105c, 105d, in particular, two pairs of MOSFET transistors 105a, 105b, 105c, 105d.

For instance, as is shown in FIG. 2, the gate of a first transistor 105a may be coupled to the source or drain of a second and third transistor 105b, 105c. Further, the gate of a fourth transistor 105d may also be coupled to the source or drain of the second and third transistor 105b, 105c, the gate of the second transistor 105b may be coupled to the source or drain of the first and fourth transistor 105a, 105d, and the gate of the third transistor 105c may also be coupled to the source or drain of the first and fourth transistor 105a, 105d.

Still further, an output of the amplifying element 104a may be coupled to the gate of the second transistor 105b, the gate of the third transistor 105c, and the source or drain of the first and fourth transistor 105a, 105d. In addition, an output of the amplifying element 104b may be coupled to the gate of the first transistor 105a, the gate of the fourth transistor 105d, and the source or drain of the second and third transistor 105b, 105c.

Whenever there is activity/deliberate activity on the bus 2a, i.e., whenever a differential level shift occurs on the bus 2a/the above transmission lines 12a, 12b, e.g., when there is a slope 6a of a first direction in the differential signal 5 (as, e.g., both the first and second polarity signals 5a, 5b change their states), the latch 102 flips from a first state (during which, e.g., the first and second transistor 105a, 105b are conducting, and the third and fourth transistor 105c, 105d are non-conducting) to a second, opposite state (during which, e.g., the first and second transistor 105a, 105b are non-conducting, and the third and fourth transistor 105c, 105d are conducting).

When a further activity/deliberate activity, i.e., a further differential level shift occurs on the bus 2a, e.g., when there is a slope 6b of a second, different, opposite direction in the differential signal 5 (as, e.g., both the first and second polarity signals 5a, 5b again change their states), the latch 102 flips back from the above second state (during which, e.g., the first and second transistor 105a, 105b are non-conducting, and the third and fourth transistor 105c, 105d are conducting) to the above first, opposite state (during which, e.g., the first and second transistor 105a, 105b are conducting, and the third and fourth transistor 105c, 105d are non-conducting).

Thereafter, only when a still further activity/deliberate activity, i.e., a still further differential level shift occurs on the bus 2a, e.g., when there is a further slope of the first direction in the differential signal 5, the latch 102 again flips from the above first state (during which, e.g., the first and second transistor 105a, 105b are conducting, and the third and fourth transistor 105c, 105d are non-conducting) to the above second, opposite state (during which, e.g., the first and second transistor 105a, 105b are non-conducting, and the third and fourth transistor 105c, 105d are conducting), etc.

In other words, as long as there is no activity/deliberate activity on the bus 2a, i.e., as long as no differential level shift occurs on the bus 2a/the above transmission lines 12a, 12b, the latch 102 (in particular, its transistors 105a, 105b, 105c, 105d) remains in a respective state, and substantially does not consume any power/current (apart from leakage currents).

Hence, at an output 102a of the latch 102, and therefore, on a line 107 connecting the output 102a of the latch 102 with an input of the above monoflop 101, a wakeclock signal 108 is generated, which essentially corresponds to a single-ended map of the wakeup sequence (e.g., the differential signal "010101010101 . . . ") received on the transmission lines 12a, 12b of the bus 2a.

As a consequence, the (re-triggerable) monoflop 101/(re-triggerable) univibrator 101 is kept being triggered, i.e., is first triggered by a first pulse 108a of the consecutive pulses 108a, 108b, 108c of the wakeclock signal 108, and is then triggered again and again by each of the following pulses 108b, 108c, . . . of the wakeclock signal 108.

Therefore, a wake signal 109 at an output 101a of the (re-triggerable) monoflop 101/(retriggerable) univibrator 101 changes from a "not set" to a "set" state, and remains in said "set" state as long as the wakeup sequence is present on the bus 2a/the above transmission lines 12a, 12b.

When it is, e.g., detected that the above wake signal 109 is "set," or is in the "set" state for at least a predetermined period of time, it may be detected that the module/component/element/integrated circuit 1a, 1b, 1c, 1d, 1e associated with the wakeup receiver circuit 200 is to be "woken up" (wakeup detection), i.e., is to be brought from the above power saving mode/power down mode to the normal operating mode.

Due to the differential implementation of the wakeup receiver circuit 200, it may be achieved that only differential signals at the transmission lines 12a, 12b may lead to a wakeup detection, so that erroneous wakeup detections caused, e.g., by common mode disruptions on the transmission lines 12a, 12b, etc. may be prevented. Further, as the wakeup receiver circuit 200 is capacitively coupled to the transmission lines 12a, 12b, it is substantially independent from the respective DC levels present on the bus 2a (instead, substantially, it only reacts to respective level shifts). Further, as becomes clear from the explanations above, the wakeup receiver circuit 200 substantially does not consume any current (apart from leakage currents), and may not need any bias currents or external reference voltages.

As soon as the respective module/component/element/integrated circuit (e.g., the module/component/element/integrated circuit 1b), in response to a wakeup detection, has been brought from the power saving mode/power down mode to the normal operating mode, it may forward the wakeup sequence/wakeup sequence signal (still) received from the preceding module/component/element/integrated circuit in the chain (e.g., from the module/component/element/integrated circuit 1a via the bus 2a at the above transmission lines 12a, 12b) to the next module/component/element/integrated circuit in the chain (e.g., via the bus 2b to the module/component/element/integrated circuit 1c).

Thereby, the wakeup sequence/wakeup sequence signal on the bus 2a (still received on, e.g., the respective LS Interface of the integrated circuit 1b) may be shifted by the respective Level Shifter, e.g., the Level Shifter 13b from the voltage domain of the integrated circuit 1a to the voltage domain of the integrated circuit 1b. Then, the voltage shifted received wakeup sequence/wakeup sequence signal may, e.g., be transmitted from the integrated circuit 1b (in particular, the respective HS Interface thereof) via the bus 2b to the integrated circuit 1c (in particular, the respective LS Interface thereof). The integrated circuit 1c, in response, may also be brought back from the above power saving mode/power down mode to the normal operating mode, and then may forward the received, further level shifted, wakeup sequence/wakeup sequence signal to the next integrated circuit in the chain, e.g., the integrated circuit 1d, etc.

What is claimed is:

1. A method, comprising:
    operating a device in a low power mode of operation, the device coupled to a bus;
    receiving, by the device, a differential signal from the bus, the differential signal comprising a first polarity signal and a second polarity signal;
    detecting, by the device, activity on the bus comprising
        receiving the first polarity signal through a first series connected capacitor at a first node of a cross-coupled latch circuit of the device, and
        receiving the second polarity signal through a second series connected capacitor at a second node of the cross-coupled latch circuit, wherein the cross-coupled latch circuit comprises a first transistor pair coupled to the bus by the first series connected capacitor, and a second transistor pair coupled to the bus by the second series connected capacitor; and
    causing a wakeup of the device in response to the detection of the activity.

2. The method of claim 1, further comprising receiving one or more signals from the cross-coupled latch circuit at an input terminal of a monoflop circuit of the device.

3. The method of claim 1, wherein causing the wakeup of the device comprises detecting the activity on the bus within a predetermined period of time.

4. The method of claim 1, wherein detecting activity on the bus comprises detecting a slope of the differential signal received from the bus.

5. The method of claim 4, wherein detecting a slope of the differential signal comprises comparing the slope to a threshold.

6. The method of claim 4, wherein detecting a slope of the differential signal comprises detecting a first slope of the first polarity signal and a second slope of the second polarity signal.

7. The method of claim 1, wherein the device and a plurality of additional devices are connected in a chain-like structure, the method further comprising forwarding, by the device, the differential signal to a next device of the plurality of additional devices in the chain-like structure.

8. The method of claim 7, comprising forwarding the differential signal at least until a wakeup of a last device in the chain-like structure is caused.

9. A circuit comprising:
    a wakeup receiver circuit coupled to a bus and configured to detect a change of a differential signal present on the bus to cause a wakeup of a device coupled to the bus in response to the detection, the wakeup receiver circuit comprising:
    a cross-coupled transistor latch circuit configured to be coupled to the bus; and
    a monoflop circuit coupled to an output of the cross-coupled transistor latch circuit, wherein the cross-coupled transistor latch circuit comprises a first transistor pair configured to be coupled to the bus by a first capacitor, and a second transistor pair configured to be coupled to the bus by a second capacitor.

10. The circuit of claim 9, wherein the cross-coupled transistor latch circuit does not substantially consume power when in a stable state.

11. The circuit of claim 9, wherein the monoflop circuit is configured to be coupled to the second transistor pair of the cross-coupled transistor latch circuit.

12. The circuit of claim 9, wherein the differential signal present on the bus comprises a first signal and a second signal, and wherein causing the wakeup of the device is based at least in part on a first slope of the first signal and a second slope of the second signal.

13. The circuit of claim 12, wherein the circuit is configured to compare the first slope to at least one threshold.

14. A system, comprising:
    a plurality of devices connected in a chain-like structure, each device of the plurality of devices coupled to at least one bus;
    wherein a device of the plurality of devices comprises a circuit configured to detect activity of a differential signal of a bus coupled to the device to cause a wakeup of the device in response to the detection, and the circuit comprises a latch circuit coupled to the bus by at least one capacitor, the latch circuit comprising
        a first transistor having a first output terminal coupled to an input node of the latch circuit, a gate terminal coupled to an output node of the latch circuit, and a second output terminal coupled to a first voltage supply terminal,
        a second transistor having a first output terminal coupled to the output node of the latch circuit, a gate terminal coupled to the input node of the latch circuit, and a second output terminal coupled to the first voltage supply terminal,
        a third transistor having a first output terminal coupled to the output node of the latch circuit, a gate terminal coupled to the input node of the latch circuit, and a second output terminal coupled to a second voltage supply terminal, and
        a fourth transistor having a first output terminal coupled to the input node of the latch circuit, a gate terminal coupled to the output node of the latch circuit, and a second output terminal coupled to the second voltage supply terminal.

15. The system of claim 14, the circuit comprising a monoflop circuit coupled to the output node of the latch circuit.

16. The system of claim 15, wherein the monoflop circuit is configured to send a wakeup signal to the device to cause the wakeup of the device.

* * * * *